United States Patent
Frey

Patent Number: 6,083,342
Date of Patent: Jul. 4, 2000

[54] CONTAINER LABELING SYSTEM

[75] Inventor: Eugene J. Frey, Walton, Ky.

[73] Assignee: Owens-Brockway Plastic Products Inc., Toledo, Ohio

[21] Appl. No.: 09/040,367

[22] Filed: Mar. 18, 1998

[51] Int. Cl.[7] .............................. B32B 31/00; B65C 1/00
[52] U.S. Cl. .................... 156/297; 156/277; 156/DIG. 2; 264/129; 264/132; 428/36.6
[58] Field of Search ..................... 156/297, 556, 156/277; 264/129, 132, 509; 428/36.6

[56] References Cited

U.S. PATENT DOCUMENTS

| | | |
|---|---|---|
| 2,547,817 | 4/1951 | Frank . |
| 2,920,780 | 1/1960 | Hauschild et al. . |
| 3,109,365 | 11/1963 | Karlyn . |
| 3,282,245 | 11/1966 | Nowak . |
| 3,286,626 | 11/1966 | Nowak . |
| 3,311,051 | 3/1967 | Rudolph et al. . |
| 3,441,458 | 4/1969 | Milliken . |
| 3,494,059 | 2/1970 | Minasian . |
| 3,704,957 | 12/1972 | Petroff . |
| 3,750,317 | 8/1973 | Morgan . |
| 3,874,977 | 4/1975 | Pyles . |
| 3,944,058 | 3/1976 | Strauss . |
| 3,988,015 | 10/1976 | Scantlin . |
| 4,005,649 | 2/1977 | Strauch et al. . |
| 4,019,935 | 4/1977 | Harvey . |
| 4,133,923 | 1/1979 | Blunt . |
| 4,281,762 | 8/1981 | Hattemer ................................. 206/390 |
| 4,381,211 | 4/1983 | Nechay . |
| 4,398,627 | 8/1983 | Saccani . |
| 4,452,659 | 6/1984 | Geurtsen et al. . |
| 4,587,158 | 5/1986 | Ewing . |
| 4,601,926 | 7/1986 | Jabarin et al. ............................ 428/35 |
| 4,735,664 | 4/1988 | Asghar et al. . |
| 4,848,227 | 7/1989 | Campioli . |
| 4,855,005 | 8/1989 | Jodrey . |
| 5,127,321 | 7/1992 | Proffer . |
| 5,137,136 | 8/1992 | Humele . |
| 5,250,129 | 10/1993 | Twele . |
| 5,284,688 | 2/1994 | Hiatt . |
| 5,292,566 | 3/1994 | Shacklett, III . |
| 5,320,889 | 6/1994 | Bettle, III . |
| 5,351,426 | 10/1994 | Voy et al. . |
| 5,388,683 | 2/1995 | Norton . |
| 5,484,047 | 1/1996 | Plenzler . |
| 5,489,455 | 2/1996 | Nugent, Jr. et al. ................. 428/36.91 |
| 5,571,358 | 11/1996 | Napier et al. ........................... 156/227 |
| 5,639,529 | 6/1997 | Gozdecki et al. . |
| 5,649,701 | 7/1997 | Mills et al. . |
| 5,654,054 | 8/1997 | Tropsha et al. ........................ 428/36.6 |

*Primary Examiner*—Richard Crispino
*Assistant Examiner*—Sue A. Purvis

[57] ABSTRACT

A system and method for rapidly labeling a blow-molded hollow container made of a plastic composition subject to out-gassing after de-molding. Otherwise, conventional high speed silk screen labeling technology and processing is employed shortly after container fabrication de-molding in order to accurately deposit a continuous liquid layer of conventional silk screen ink over an external container surface area designated for application thereon of a self-adhering pre-printed label. The label is rapidly and accurately transfer applied over the silk screen coated area immediately after the same has dried, and even while out-gassing is still occurring from the de-molded to container. However, the protective ink barrier coating prevents formation of bubbles beneath the label. Those gases in the container wall resident beneath the label-affixed area can then nevertheless out-gas by migrating out of the container internal wall surface. Also, labeling may be silk screen imprinted on the container surface in a designated label-receiving area, and/or on non-designated surface area concurrently with barrier coating of the designated area. A gas-blocking clear ink barrier layer may be silk screened over the silk screen imprinting, and then the label applied over the gas-blocking layer of clear ink when dry. The label may be "peelable" for customer rebate return without thereby altering the labeling information remaining on the container. The pre-printed label may be a replicate of the label-covered imprinting so that the "trade dress" need not be altered by the peelable label, and so that the container surface area available for permanent labeling is maximized.

19 Claims, 2 Drawing Sheets

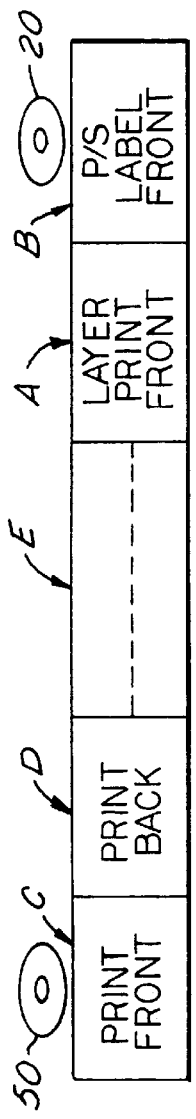
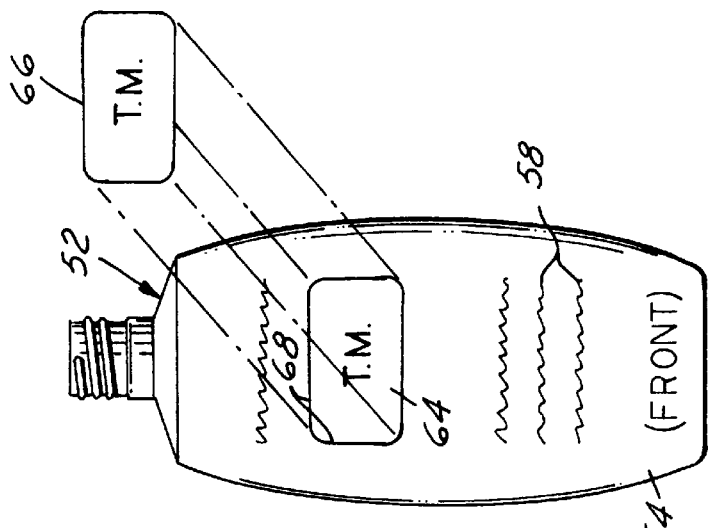
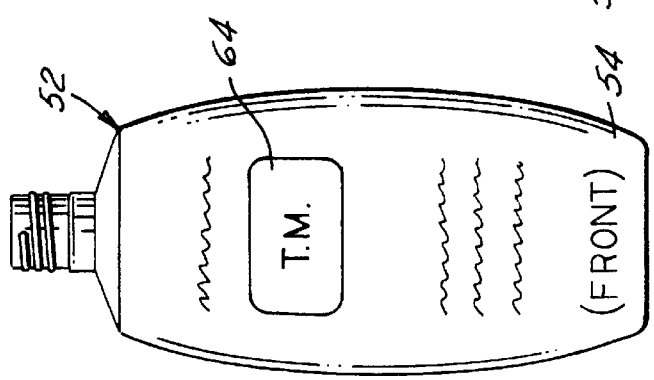
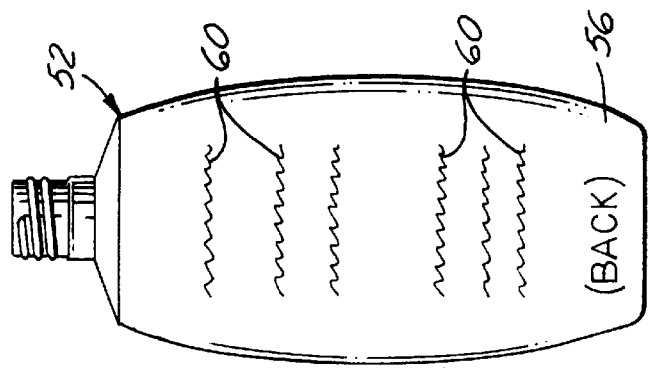
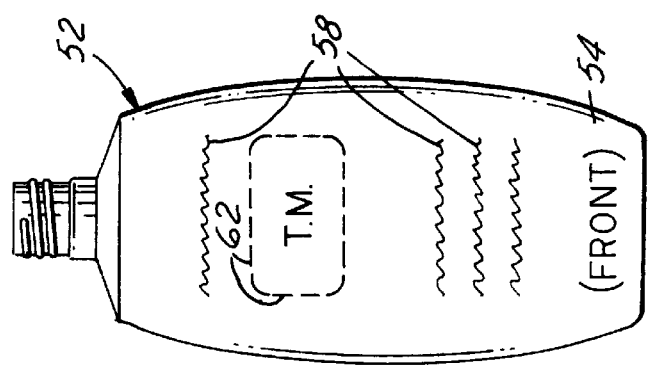

CONTAINER LABELING SYSTEM

FIELD OF THE INVENTION

This invention relates to applying labels to articles and more particularly to applying labels to containers of molded plastic composition.

BACKGROUND OF THE INVENTION

In the application of labels by what is known as transfer labeling, it is customary to position labels on a web and thereafter transfer the labels to the articles to be labeled. In one type of such labeling, heat-sensitive labels are used that must be heated and applied to the articles. In another type, pressure-sensitive labels are used that must be removed from the web and applied to the article. An improved apparatus that can be readily changed for use either for applying heat-sensitive labels or for applying pressure-sensitive labels is that disclosed and claimed in U.S. Pat. No. 5,250,129 issued in the name of Terence J. Twele and assigned to Owens-Illinois Plastic Products Inc., of Toledo, Ohio, assignee of record herein, which is incorporated herein by reference.

When applying such labels to articles of molded plastic composition, particularly blow-molded plastic containers composed of high density polyethylene or the like, in accordance with conventional technology it is necessary to delay application of the labels for a prolonged period of time, such as 24 hours, after removal of the containers from the mold in which they are fabricated to allow de-gassing of the container walls. Gases are trapped within the plastic material of the container walls as a result of the fabrication process, particularly in blow molding processes, and these gases must be allowed to migrate out of the container walls before running the containers through a labeling apparatus or process. Otherwise, if a pressure-sensitive or heat-sensitive label, particularly one made of non-breathable material such as a metalized pressure-sensitive label, is placed on the container prior to de-gassing, the residual gases that migrate out of the container wall material beneath the label will create bubbles beneath the label, thereby resulting in a defectively labeled product requiring costly re-processing and/or scrapage.

Of course, the prolonged delay period required for de-gassing after molding prior to transfer labeling of such plastic articles adds to production and hence product costs, particularly in a high volume mass production set-up. The de-gassing delay period entails mechanized transport equipment, storage space requirements, and added potential for damage to the article in such de-gassing processing intermediate the molding and labeling stations.

It is also common practice in the plastic container manufacturing art to imprint labeling information indicia on mold-fabricated plastic containers by employing a silk screening operation. Upon removal from the mold, the fabricated container is placed on a conveyor and conveyed successively through several stations, at one or more of which labeling information is silk screened onto one or more exterior surfaces of the container wall. Multiple stages are employed for multiple-color labeling and decorating.

Typical apparatus for printing or decorating by silk screening is shown in U.S. Pat. Nos. 4,005,649 and 4,398,627, and an improvement thereover is disclosed and claimed in U.S. Pat. No. 5,484,047 issued Jan. 16, 1996 in the name of John A. Plenzler and assigned to Owens-Illinois Plastic Products Inc., the aforementioned assignee of record herein, which is also incorporated herein by reference.

Such labeling of molded plastic articles by silk screen imprinting with typical silk screen ink materials, even when practiced on blow-molded plastic containers, does not require the aforementioned de-gassing delay period in the production process inasmuch as the labeling so applied to the container wall is inherently highly gas pervious or permeable since the ink-imprinted alphabetical and numerical characters are spaced from one another throughout the labeling and thus cover only a minor percentage of the exterior wall surface area available for out-gassing.

OBJECTS OF THE INVENTION

Accordingly, among the objectives of the present invention are to provide an improved system and method that enables conventional transfer labeling methods and equipment to be employed to apply pre-printed labels made of gas impermeable material to the appropriate surface area of the article, such as the container wall, while de-gassing from the plastic material of the article is still occurring but nevertheless preventing formation of gas bubbles beneath the applied label, thereby eliminating the need for the aforementioned de-gassing delay period between de-molding and transfer labeling and thus eliminating the attendant production cost penalties.

Another object is to provide an improved system and method of the aforementioned character that also enables conventional silk screening technology, apparatus, methods and materials to be employed during de-gassing of the molded article, and that enables composite labeling of the finished article by both silk screen and transfer labeling while still eliminating the aforementioned de-gassing delay period prior to transfer labeling.

A still further object of the invention is to provide a new and improved article of manufacture made of a molded plastic composition having silk-screen-imprinted labeling on the exterior surface thereof wherein all or a portion of such silk screen is covered by a removably attached label pre-printed with indicia that is a replicate of the silk screen imprinted indicia covered by the label, thereby enabling the article to have a label that is end-use customer removed for rebate-type return or similar merchandising promotion while thereafter still leaving the article fully labeled, thereby maximizing the available labeling surface area of the article without altering the point-of-sale trade dress of the article.

SUMMARY OF THE INVENTION

In general, and by way of summary description and not by way of limitation, the present invention achieves the aforementioned objectives by employing conventional silk screen label technology and processing shortly after container fabrication de-molding in order to deposit a layer of conventional silk screen ink over the entire predetermined area of the external container surface designated for application thereon of a self-adhering label of either the pressure-sensitive or heat-sensitive type. This silk screen ink covering of the label receiving area of the container surface customarily drys very quickly so that the self-adhering label may be transfer applied over the silk screen area immediately after silk screening and even while out-gassing is still occurring from the molded article. However, the silk screen ink layer is sufficiently gas impermeable so as to prevent migration of gases out of that portion of the container exterior surface disposed beneath the applied label, and hence this protective ink barrier in turn prevents formation of bubbles beneath the label. Those gases in the container wall resident beneath the label-affixed area can then nevertheless out-gas by migrating out of the internal wall surface from the interior of the container and/or from the marginal exterior surface area surrounding the labeled area. Preferably the silk screen ink layer deposited beneath the self-adhering label is clear (non-pigmented) and compounded to be non-transmissive to ultraviolet energy.

It is also contemplated in accordance with the present invention to provide a silk screen imprinted label on the container beneath the transfer-applied self-adhering label. In this embodiment, the gas-blocking ink layer is silk screened over the silk screened label imprinting, and then the self-adhering label transfer applied over the gasblocking layer of ink. This provides a new article of manufacture in which the selfadhered label may be "peelable" by a customer for return to obtain a rebate, for example, without thereby altering the contents of the labeling information remaining on the container after removal of the peelable label. Hence the "trade dress" of the article need not be altered in order to provide a peelable label on the same, and the available surface area available for labeling is thus maximized.

BRIEF DESCRIPTION OF THE DRAWINGS

The foregoing as well as other objects, features and advantages of the present invention will become apparent from the following detailed description of the best mode of making and using the invention, from the appended claims and from the accompanying drawings wherein:

FIG. 5 is a schematic block diagram of a third embodiment of the method of the invention for constructing a third embodiment container of the invention as further illustrated in FIGS. 6–9.

FIG. 6 is a side elevational view of a container after being silk screen imprinted on the front side surface thereof in the first stage of the method of FIG. 5.

FIG. 7 is a side elevational view of the rear or back side of the container of FIG. 6, after being silk screen imprinted on the back in the second stage of the method of FIG. 5.

FIG. 8 is a side elevational view of the front of the container of FIGS. 6 and 7 after a designated surface area has been clear overcoated with a gas barrier layer in a designated removable label receiving zone thereof in the third stage of the method of FIG. 5

FIG. 9 is a side elevational view of the container of FIGS. 6–8 as prepared through the third stage of FIG. 8 illustrating the application of a pre-printed self-adhering label to the barrier coat zone on the front of container to thereby provide the container in finished form pursuant to the completed processing sequence of the method of FIG. 5.

DETAILED DESCRIPTION OF PREFERRED EMBODIMENTS

Figure 1:
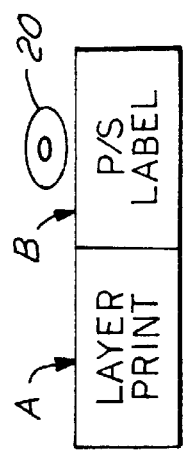
FIG. 1 is a schematic block diagram of a first embodiment of the improved method of the invention for constructing a first embodiment container of the invention as further illustrated in FIGS. 2 and 3.
Figure 3:
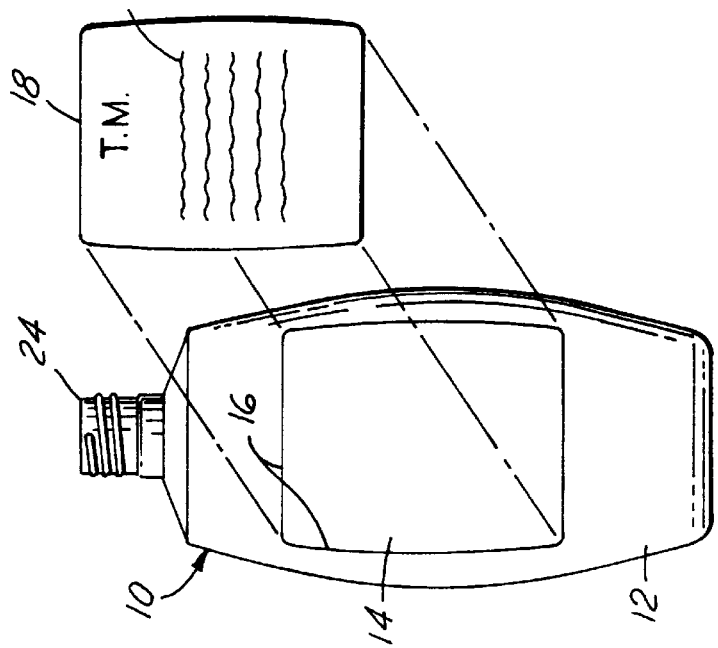
FIG. 3 is a view of the container as prepared in FIG. 2 with a pre-printed self-adhering label diagrammatically juxtaposed in exploded format to indicate its assembly and orientation on the finished container made in accordance with the first embodiment method.
Figure 2:
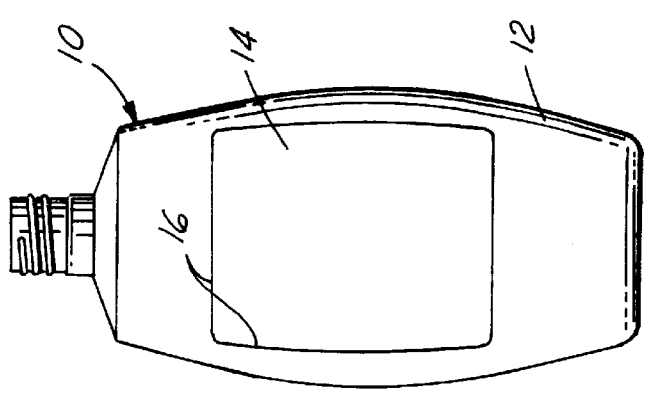
FIG. 2 is an elevational view of a blow molded plastic container after de-molding and imprinting of a gas barrier silk screen ink coating on a designated label-receiving area of exterior surface of the container in accordance with the first embodiment method.

Referring in more detail to the accompanying drawings, FIGS. 1, 2 and 3 illustrate a first embodiment of the method for producing a preferred but exemplary embodiment of a molded plastic article bearing a pre-printed label without requiring a de-gassing delay period between de-molding and label application. In the first step of the method (not illustrated), a conventional hollow container in the form of a screw top open bottle 10 (FIG. 2) is blow molded in a conventional manner of a suitable thermoplastic composition material, such as high density polyethylene or the like. Then immediately upon de-molding of bottle 10, and while out-gassing is occurring from the plastic material as molded at both the interior and exterior surfaces of bottle 10, the same is transported on conventional conveyor equipment (not shown) into the "layer print" stage A (FIG. 1) of the method.

Stage A is equipped with conventional automatic silk screening apparatus such as that described and referenced in aforementioned U.S. Pat. No. 5,484,047. A suitable silk screen is provided in this apparatus that is constructed to apply to an exterior surface 12 of the de-molded container 10, typically the container front side, and by silk screen imprinting, a single coating of silk screen ink material to provide a gas impervious barrier layer 14 within the predetermined zone designated by the edge boundary lines 16. Preferably this layer of silk screen ink is at least co-extensive with the entire predetermined area of the container external surface that is to be subsequently covered by the self-adhering pre-printed transfer label 18 (FIG. 3). This silk screen ink material characteristically dries very quickly to thereby rapidly form a vapor impermeable barrier 14 on the exterior surface 12 of container 10.

Preferably, in accordance with one principal feature of the invention, the layer print stage A is set up directly in line with and immediately downstream of the product output of the blow molding machine so that the elapsed time and conveyor equipment between de-molding and imprinting of the barrier layer 14 is minimized. Container 10 will thus normally be at an elevated temperature due to its latent heat from the molding operation, thereby further shortening drying time for the silk screen liquid ink applied to form barrier layer 14.

Preferably, in accordance with another principal feature of the invention, stage B of the process of FIG. 1 is set up immediately downstream of Stage A in the production processing line, and may employ conventional automatic transfer labeling apparatus. Since the process of the invention is usable with either pressure-sensitive or heat-sensitive adhesive pre-applied to the underside of the label film material to form a self-adhering label, it is preferred to employ the improved transfer label applying apparatus of the aforementioned Twele U.S. Pat. No. 5,250,129 as the processing apparatus for performing the method step of Stage B. This transfer label apparatus is operable automatically and with precision to apply a pre-printed label 18 in a manner to precisely overlay and be contiguous with the barrier coating layer 14 on the exterior surface 12 of bottle 10. As indicated in FIG. 3, label 18 is pre-printed with suitable trade dress indicia, such as a trademark ("TM"), as well as with lines of labeling indicia 22 conventionally printing press applied thereon in the manufacture of the transfer label strips in roll form on a web along which the labels are positioned for removal and transfer to the surface of bottle 10.

Due to the provision of the gas impermeable barrier layer 14, the label applying operation of the transfer label apparatus in Stage B can be performed while residual gases trapped in the wall of container 10 as a result of the plastic molding fabrication process, such as occurs in blow molding, are still migrating out (out-gassing) of the molded plastic material forming container walls. The silk screened ink layer 14, once dry, is operable to sufficiently prevent out-migration of those material-entrained gases via the area of the container exterior surface disposed beneath the applied label 18, i.e., surface area of front surface 12 bounded by the boundary line 16 of layer 14. Accordingly, such gases do not collect beneath the adhered label 18 to form bubbles beneath this label. Rather, the gases in the front wall beneath label 18 in the zone bounded by the line 16 must migrate out of the interior surface of wall 12 primarily into the hollow interior of container 10 to be vented therefrom through the open top 24 of container 10, although some may migrate laterally and hence escape to ambient via the exterior surface surrounding layer boundary 16.

Once the labeling stage B is completed, container 10 bearing label 12 adhered thereto may be transported to the storage and shipping station for packaging and shipment to the bottler customer. Further de-gassing of the labeled container until the same is completely de-gassed can thus occur in the normal transit and storage time interval that occurs in these downstream operations and hence is efficiently accomplished without increasing production cycle time or increasing production costs.

The silk screen ink material applied in Stage A may be an inexpensive formulation since its appearance aspect is not critical, so long as it has the usual characteristic of quick drying time and is substantially gas impermeable when dry. The thickness of the applied layer of ink is likewise adjusted empirically in accordance with this parameter. The ink may be a clear solution so that the cost of ink pigmentation material is eliminated in the formulation. On the other hand, an ink formulation containing coloring pigment may be employed if desired to cooperate with the nature of the self-adhering label 18, e.g., in the event that the pre-printed label is made of translucent or transparent material and background coloring is desired to be imparted by the coating layer 14.

The use of silk screening technology and apparatus is preferred for applying layer 14 due to its ability to rapidly operate in a precision manner to repetitively apply the coating layer 14 in exactly the designated zone that is to be 100% covered by label 18. However, if desired, other coating methods and apparatus may be employed to impart the barrier label 14. Likewise, other gas impermeable coating materials with quick drying capability, other than silk screening ink materials, may be employed.

Likewise, rotary stamp-pad-type printwheels of conventional construction may be employed in lieu of silk screening apparatus for applying barrier layer 14, depending on the geometry and configuration of container 10. However, for curved surfaces, silk screening apparatus is normally preferable for use in the process due to its ability to conform to curved container surfaces as well as to flexible and resiliently deformable surfaces of the container.

The self-adhering label 18 may be made of highly gas impermeable material without danger of bubble defects occurring therein, and hence may be made of metalized film for enhancing the appearance and colorgraphics obtainable on the trade dress of the finished article. In addition, the process is compatible with either heat-sensitive or pressure-sensitive type adhesives pre-applied to the pre-printed label 18. Indeed, in the case of heat-sensitive self-adhering material on the back side of the label 18, cure time is accelerated due to the latent heat of container 10 still remaining at this immediately adjacent downstream location of stage B, which in turn is immediately downstream of the de-molding operation, thereby further shortening overall production cycle time of the process. Thus, in some instances, such latent molding heat in the container can obviate the need for providing a heating apparatus or station in the transfer label apparatus when applying heat-sensitive type labels 18.

Figure 4:
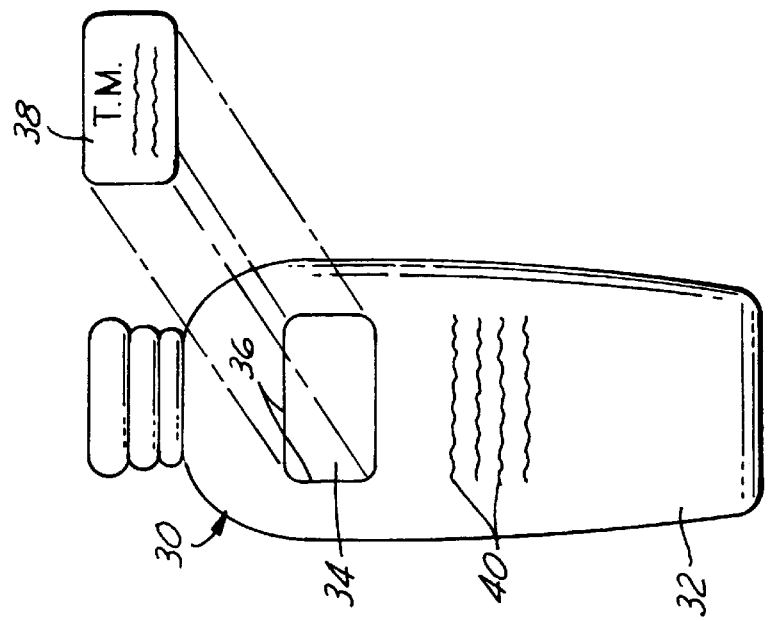
FIG. 4 is an elevational view of a second embodiment container made by a second embodiment of the method of the invention in which the outer surface of the container has both a gas barrier silk screen imprinted thereon in a designated label receiving zone as well as silk screen labeling information imprinted thereon outside the transfer label zone, and with a preprinted self-adhering transfer label shown juxtaposed in exploded format to indicate its assembly and orientation on the finished container.

FIG. 4 illustrates a second embodiment of the method and apparatus set up to of the invention wherein a blow molded open top container 30 is provided with a composite form of labeling on the exterior surface 32 of the container front wall. In this embodiment, the silk screen apparatus of stage A again is operable to silk screen imprint a vapor barrier layer 34 having its edge boundary lines 36 located to be contiguous with the boundary edge of a pre-printed self-adherent label 38 subsequently applied over layer 34 at stage B as described previously. However, the silk screen is modified such that suitable lines of visible alphabetical or numeric lettering or like indicia 40 are silk screen imprinted on surface 32 outside the boundary 36 and simultaneously with the imprinting of barrier layer 34. The trade dress of container 30 may thus be provided with a composite labeling format as is often desired in many consumer product applications. Again, stages A and B are employed immediately in series downstream of the de-molding operation while de-gassing of container 30 is still occurring, thereby once again eliminating any processing delay hitherto involved in awaiting completion of de-gassing before applying the self-adhering label 38.

FIGS. 5–9 illustrate a third embodiment of the system, method and apparatus set up of the invention in providing another novel compositely labeled plastic article, herein shown as a blow molded plastic bottle. In FIG. 5, it will be seen that this process embodiment employs conventional silk screen labeling technology, such as silk screen indicia printer 50, in printing stages C, D and E arranged in sequence upstream of the previously described stages A and B. In this set-up, a fabricated plastic container, typified again by a blow molded screw top plastic container 52 of the squeeze bottle type, is placed on a suitable conveyor (not shown) and conveyed through silk screen imprinting stations C, D and E. At one or more of such stations, labeling information is silk screened onto both the front surface 54 and back surface 56 of container 52 in a conventional manner. Stage E is provided schematically to indicate a series of successive multiple silk screening stages as typically employed for multiple-color labeling on the front and back surfaces 54 and 56, as may be desired for a given container. Thus, after container 52 has completed stages C, D and E, it will appear as shown in FIGS. 6 and 7, i.e., a completely labeled container bearing all the labeling indicia as silk screen imprinted thereon, comprising lines of alphabetical and/or numeric labeling characters 58 on front surface 54 and likewise such silk screen imprinted lines of indicia 60 on back surface 56. Thus, it is to be noted that after stages C, D and E, and prior to stage A, a source of origin indicia, such as a trademark indicated "TM", has been silk screen imprinted on the front surface 54 in the predetermined labeling zone designated by the broken lines 62 in FIG. 6. As so labeled, bottle 52 can fully meet all bottle-customer trade dress and labeling requirements and specifications, FDA and/or FTC labeling requirements, etc., and is thus ready as a completed point-of-sale package (except for filling and capping). The silk screening operations of stages C, D and E are preferably provided immediately downstream of the product output end of the molding operation and thus occur while container de-gassing is likewise simultaneously occurring, in accordance with conventional in-line silk screening production processing.

However, in accordance with the system of FIG. 5, the completely silk screen labeled container 52 of FIGS. 6 and 7 is then processed through stages A and B as shown in FIGS. 8 and 9. In stage A, a barrier layer 64 is silk screened imprinted over the previous silk screen imprinted indicia already present in the predetermined labeling zone surface area bounded by the zone line 62 on the front surface 54 of container 52. Again this silk screen applied ink material dries quickly and during transit to stage B. At stage B, a self-adhering label 66 is applied by the transfer label apparatus 20 to preferably 100% cover barrier layer 64, with the outer edge of label 66 thus being contiguous with the outer edge 68 of layer 64. Again, note that no delay period is provided in this multiple stage processing sequence of FIG. 5 in order to complete out-gassing of the bottle 52. Hence when bottle 52 has label 66 applied thereto in stage B, the same may be again conveyed to the packaging and shipping area while further and complete de-gassing of bottle 52 is concurrently being completed.

In accordance with another feature of the present invention, label 66 is preferably of the self-adhering type that is peelable for removal from the container by the end-user customer. It is to be noted that label 66 is preferably pre-printed with the identical indicia and whatever trade dress may have been previously silk screen imprinted in zone 62. Hence applied label 66 does not alter or obliterate the original trade dress and indicia imprinted on bottle 52 in stages C–E so that, if desired, as so labeled in stage B, the finished bottle 52 is basically unaltered in trade dress appearance and likewise is point-of-sale ready.

The typical carton in which bottle 52 is packaged, or the accompanying package sales literature, or even a tiny legend on label 66, can inform the end-user customer that label 66 is peelable so that if and when removed and returned to the retailer or container bottler manufacturer, a discount, rebate, or other sales promotional item will be sent to the end-user customer. As is often the case, the bottle product manufacturer may additionally include some identifying indicia on label 66 so that label returns are coded to point-of-sale locations to develop marketing information and similar business data. However, when the customer has peeled off label 66, the product as contained in bottle 52 is still fully labeled on both its front and back surfaces without alteration in its trade dress and labeling information imprinted on its front and back surfaces. This feature is, of course, important to the bottler, retailer and end-user customer, i.e., all entities in the chain of distribution, from the standpoint of both marketing factors and governmental regulations.

It is to be understood that peelable label 66 and corresponding barrier layer 64 may be sized to cover all of the silk screen imprinting on front surface 54, if desired, and accordingly pre-printed to replicate the entire underlying silk screen imprinting on surface 54. Alternatively, label 66 may be pre-printed with whatever other alternative non-duplicative indicia and trade dress information may be desired by the bottling customer to feature the rebate promotion, and also may be applied alternatively to the back surface 56. In any event, the silk screen imprinted barrier layer 64 is preferably sized and located accordingly to underlie at least the entire label 66.

From the foregoing description, it now will be also understood that the system and method of the invention can also efficiently provide a new article of manufacture in terms of a pre-printed self-adhering label applied over previously silk screened labeling on a container, even in the absence of the application of a gas barrier layer 64, and regardless of the purpose of the silk screening underlay applied to the container surface. The provision of a pre-printed label applied to a surface that is silk screened imprinted with indicia has many of the foregoing advantages even where outgassing of the container is not a problem.

In any event, it will be seen from the foregoing that the invention primarily features the concept of the gas impermeable barrier layers 14, 34 and/or 64 applied to a molded plastic article by silk screen technology to be disposed beneath a self-adhering gas-impervious label, either of the pressure-sensitive or heat-sensitive type, to thereby prevent defective labeling caused by creation of out-gassing bubbles from residual gases in the freshly de-molded plastic material of the article migrating to underneath such a label, while also enhancing production efficiency and reducing product cost. This system of the invention is readily adaptable to various types of highly efficient mass production equipment and processes, and preferably is adapted for use with the aforementioned Owens-Illinois patents to Plenzler U.S. Pat. No. 5,484,047 and/or Twele U.S. Pat. No. 5,250,129 to thereby provide an improved system for labeling fabricated plastic containers that achieves high speed, high volume and economical mass production on a more efficient, reliable and consistent basis.

Thus, from the foregoing specification and drawings as referenced therein, it is believed that it will now be evident to the those skilled in the art that the invention in its various features and embodiments amply fulfills the aforestated objects and provides many features and advantages over the prior art.

What is claimed is:

1. A method of labeling a fabricated plastic article that comprises the steps of:

(a) fabricating an article of molded plastic composition wherein the plastic article comprises a container, and wherein such fabricating comprises blow molding the container of plastic material that produces out-gassing from the material of the container at its surfaces for a period of time subsequent to de-molding, (b) applying to a designated exterior surface portion of the container a continuous layer of gas-impermeable material in liquid form, (c) allowing the applied liquid material layer to solidify, and then (d) applying and adhering a label over and onto said layer after solidification of said layer, such that the solidified material of the layer sufficiently impedes out-gassing from the plastic composition of the container through the solidified layer that bubbling of gases beneath the adhered label is prevented, and wherein steps (b) and (c) and (d) are performed immediately subsequent to the de-molding operation and prior to completion of said out-gassing period of time of step (a).

2. The method set forth in claim 1, wherein step (b) is performed by silk screen imprinting of the continuous layer of gas impermeable liquid material.

3. The method set forth in claim 2 wherein step (d) is performed by a transfer label apparatus feeding pre-printed labels from a web of labels for application individually to successive containers after completion of steps (a), (b) and (c) for each container.

4. The method set forth in claim 1 wherein the material applied in step (b) comprises a silk screening ink.

5. The method set forth in claim 1 wherein after step (a) and prior to step (b) labeling indicia is silk screen imprinted on an exterior surface portion of the article.

6. The method set forth in claim 5 wherein the surface portion of the article containing the silk screen imprinted indicia is oriented non-coincident with the exterior surface portion of the article designated for bearing the continuous layer of gas impermeable material.

7. The method set forth in claim 5 wherein the designated exterior surface portion containing the layer of gas impermeable material overlies at least a portion of the silk screen imprinted indicia.

8. The method set forth in claim 7 wherein the label is pre-printed to bear indicia replicating that of the silk screen imprinted indicia disposed therebeneath, and wherein said label is adhered by a peelable adhesive so as to be peelably removable from the article.

9. The method set forth in claim 1 wherein said gas impermeable liquid material is selected from the group consisting of: non-pigmented clear silk screen ink and color pigmented silk screen ink.

10. The method set forth in claim 1 wherein said label is selected from the group consisting of:
   (a) a pre-printed self-adhering label bearing heat-sensitive adhesive,
   (b) a pre-printed self-adhering label bearing a pressure-sensitive adhesive,
   (c) a self-adhering pre-printed label made of metalized gas impermeable material,
   (d) a pre-printed self-adhering label bearing a peelable adhesive,
   (e) a pre-printed self-adhering transparent label, and
   (f) a pre-printed self-adhering translucent label.

11. A method of labeling a mold-fabricated plastic container that comprises the steps of:
   (a) fabricating a container of molded plastic composition,
   (b) applying a layer of labeling indicia in a given format to an exterior surface portion of the container by silk screen ink-imprinting of the labeling indicia,
   (c) allowing the silk screen ink indicia to solidify thereby to create an impermeable barrier, and then
   (d) applying and adhering a pre-printed peelable label registered and oriented over the silk screen imprinted indicia layer such that the indicia pre-printed on the label duplicates the silk screen imprinted indicia beneath the adhered label whereby application of the label to the container and subsequent removal of the label from the container does not substantially alter the trade dress, including the applied indicia of the container.

12. A method of labeling a fabricated plastic article that comprises the steps of:
   (a) fabricating an article of molded plastic composition,
   (b) applying to a designated exterior surface portion of the article a continuous layer of gas-impermeable silk screening ink material in liquid form,
   (c) allowing the applied liquid material layer to solidify, and then
   (d) applying and adhering a label over and onto said solidified layer, such that the solidified material of the layer sufficiently impedes out-gassing from the plastic composition of the article such that bubbling of gases beneath the adhered label is prevented.

13. The method set forth in claim 12 wherein after step (a) and prior to step (b) labeling indicia is silk screen imprinted on an exterior surface portion of the article.

14. The method set forth in claim 13 wherein the surface portion of the article containing the silk screen imprinted indicia is oriented non-coincident with the exterior surface portion of the article designated for bearing the continuous layer of gas impermeable material.

15. The method set forth in claim 13 wherein the designated exterior surface portion containing the layer of gas impermeable material overlies at least a portion of the silk screen imprinted indicia.

16. The method set forth in claim 15 wherein the label is pre-printed to bear indicia replicating that of the silk screen imprinted indicia disposed there beneath, and wherein said label is adhered by a peelable adhesive so as to be peelably removable from the article.

17. The method set forth in claim 16 wherein said gas impermeable fluid material is selected from the group consisting of non-pigmented clear silk screen ink and color pigmented silk screen ink.

18. The method set forth in claim 17 wherein said label is selected from the group consisting of:
   (a) a pre-printed self-adhering label bearing heat-sensitive adhesive,
   (b) a pre-printed self-adhering label bearing a pressure-sensitive adhesive,
   (c) a self-adhering pre-printed label made of metalized gas impermeable material,
   (d) a pre-printed self-adhering label bearing a peelable adhesive,
   (e) a pre-printed self-adhering transparent label, and
   (f) a pre-printed self-adhering translucent label.

19. A method of labeling a fabricated plastic article that comprises the steps of:
   (a) fabricating an article of molded plastic composition,
   (b) applying to a designated exterior surface portion of the article a continuous layer of gas-impermeable material in liquid form selected from the group consisting of non-pigmented clear silk screen ink and color pigmented silk screen ink,
   (c) allowing the applied liquid material layer to solidify, and then
   (d) applying and adhering a label over and onto said layer, such that the solidified material of the layer sufficiently impedes out-gassing from the plastic composition of the article such that bubbling of gases beneath the adhered label is prevented.

* * * * *